United States Patent
Ali et al.

(10) Patent No.: US 8,301,102 B2
(45) Date of Patent: Oct. 30, 2012

(54) CORRECTING QUADRATURE CROSSTALK CONTAMINATION IN RECEIVERS

(75) Inventors: Isaac Ali, Bristol (GB); Nicholas P. Cowley, Wroughton (GB)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 12/646,513

(22) Filed: Dec. 23, 2009

(65) Prior Publication Data

US 2011/0151818 A1    Jun. 23, 2011

(51) Int. Cl.
*H04B 1/00* (2006.01)

(52) U.S. Cl. ............ 455/295; 455/130; 455/76; 455/77; 455/87; 455/147; 348/731

(58) Field of Classification Search .................. 455/295, 455/76, 77, 130, 178.1, 180.3, 190.1, 207, 455/87, 147; 348/731
See application file for complete search history.

(56) References Cited

U.S. PATENT DOCUMENTS

| | | | | |
|---|---|---|---|---|
| 8,121,230 B2 * | 2/2012 | Moutard | ........................ | 375/346 |
| 2006/0280264 A1 * | 12/2006 | Isaac et al. | .................... | 375/332 |
| 2006/0281411 A1 * | 12/2006 | Isaac et al. | .................... | 455/63.1 |

* cited by examiner

*Primary Examiner* — Tuan Pham
(74) *Attorney, Agent, or Firm* — Kacvinsky Daisak, PLLC

(57) ABSTRACT

An apparatus, a method and a system for correcting a phase imbalance are described. Embodiments may measure the phase imbalance inherent in a tuner and use the imbalance measure to correct the output of the tuner. Embodiments may include a tone generator to produce a single frequency tone and a tuner to receive the single frequency tone and output an intermediate frequency. The intermediate frequency may be corrected by a correction loop. Other embodiments are described and claimed.

14 Claims, 5 Drawing Sheets

500

```
Remove unwanted terms from squared IF
term to produce a remaining signal

502
```

↓

```
Lock the LO to the wanted term in the
remaining signal
504
```

↓

```
Mix the LO with the wanted term, and filter
out all but the imbalance measure term

CORRECTING QUADRATURE CROSSTALK CONTAMINATION IN RECEIVERS

BACKGROUND

Some types of radio receiver architectures, including the Weaver architecture, may be attractive due to their inherent ability to reject image channels and eliminate cross-talk. However, such architectures require very good phase and gain balance to achieve the expected performance. Such architectures suffer inherently from phase imbalance, which may lead to an unacceptable degradation in the signal to noise ratio. The levels of phase balance required to achieve a desired signal to noise ratio may not be achievable by design alone. Adding components to high-performance, low-cost, integrated tuners to correct such phase balance issues may increase the cost and/or complexity of the tuner.

BRIEF DESCRIPTION OF THE DRAWINGS

FIG. 5 illustrates one embodiment of a logic flow.

DETAILED DESCRIPTION

Embodiments of the invention may remove the error in phase imbalance in a tuner introduced due to design tolerances by measuring the imbalance during particular windows of device operation and using the measure of imbalance to correct the phase imbalance in the analog domain.

Various embodiments may include a single tone generator to input a single tone into a tuner, and a correction loop that receives the output of a tuner. The correction loop may measure the level of phase imbalance and use the measure to correct the output of the tuner.

Figure 1:
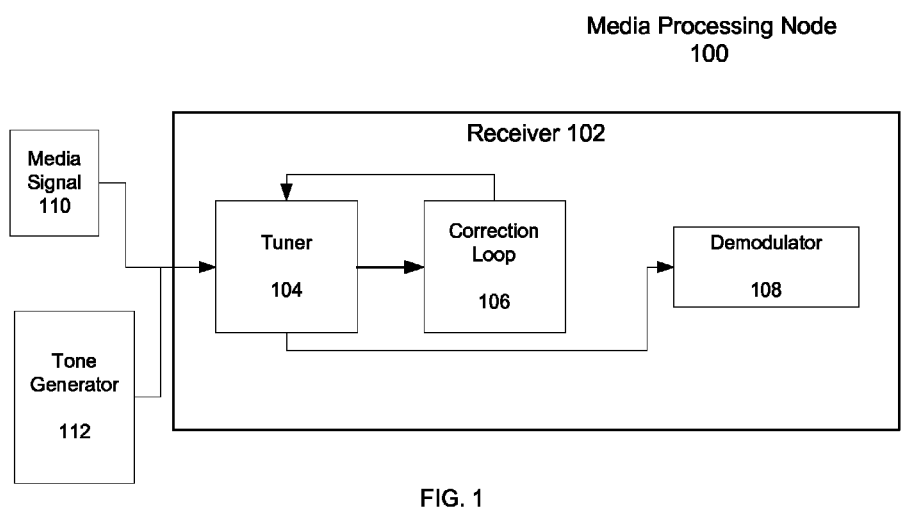
FIG. 1 illustrates one embodiment of a media processing node.

FIG. 1 illustrates one embodiment of a media processing node 100. A node generally may comprise any physical or logical entity for communicating information in the media processing node 100 and may be implemented as hardware, software, or any combination thereof, as desired for a given set of design parameters or performance constraints.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station, a radio network controller (RNC), a mobile subscriber center (MSC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

In various embodiments, the media processing node 100 may comprise, or be implemented as, one or more of a processing system, a processing sub-system, a processor, a computer, a device, an encoder, a decoder, a coder/decoder (CODEC), a compression device, a decompression device, a filtering device (e.g., graphic scaling device, deblocking filtering device), a transformation device, an entertainment system, a display, or any other processing architecture. The embodiments are not limited in this context.

In various implementations, the media processing node 100 may be arranged to perform one or more processing operations. Processing operations may generally refer to one or more operations, such as generating, managing, communicating, sending, receiving, storing forwarding, accessing, reading, writing, manipulating, encoding, decoding, compressing, decompressing, reconstructing, encrypting, filtering, streaming or other processing of information. The embodiments are not limited in this context.

In various embodiments, the media processing node 100 may be arranged to process one or more types of information, such as video information. Video information generally may refer to any data derived from or associated with one or more video images. In one embodiment, for example, video information may comprise one or more of video data, video sequences, groups of pictures, pictures, objects, frames, slices, macroblocks, blocks, pixels, and so forth. The values assigned to pixels may comprise real numbers and/or integer numbers. The embodiments are not limited in this context.

In various embodiments, for example, the media processing node 100 may perform media processing operations such as encoding and/or compressing of video data into a file that may be stored or streamed, decoding and/or decompressing of video data from a stored file or media stream, filtering (e.g., graphic scaling, deblocking filtering), video playback, internet-based video applications, teleconferencing applications, and streaming video applications. The embodiments are not limited in this context.

In various implementations, media processing node 100 may communicate, manage, or process information in accordance with one or more protocols. A protocol may comprise a set of predefined rules or instructions for managing communication among nodes. A protocol may be defined by one or more standards as promulgated by a standards organization, such as the ITU, the ISO, the IEC, the MPEG, the Internet Engineering Task Force (IETF), the Institute of Electrical and Electronics Engineers (IEEE), and so forth. For example, the described embodiments may be arranged to operate in accordance with standards for video processing, such as the MPEG-1, MPEG-2, MPEG-4, and H.264 standards. The embodiments are not limited in this context.

In various embodiments, the media processing node 100 may comprise multiple modules. The modules may comprise, or be implemented as, one or more systems, sub-systems, processors, devices, machines, tools, components, circuits, registers, applications, programs, subroutines, or any combination thereof, as desired for a given set of design or performance constraints. In various embodiments, the modules may be connected by one or more communications media. Communications media generally may comprise any medium capable of carrying information signals. For example, communication media may comprise wired communication media, wireless communication media, or a combination of both, as desired for a given implementation. The embodiments are not limited in this context.

As shown in FIG. 1, media processing node 100 may comprise a receiver 102. Receiver 102 may be, for example, a radio receiver, a television receiver, etc. Receiver 102 may include a tuner 104, a correction loop 106 and a demodulator 108. Tuner 104 may receive a media signal 110 for example, via a radio antenna, a co-axial cable input, etc. In an embodiment, tuner 104 may be a tuner constructed according to the Weaver image rejection architecture, or other architectures having a phase imbalance. In an embodiment, tuner 104 may be a single-chip tuner.

During ordinary operation, tuner 104 may receive medial signal 110 and may perform quadrature demodulation on the signal to split the signal into in-phase (I) and quadrature-phase (Q) samples. The signals may be quadrature down-converted, then quadrature up-converted to achieve an intermediate frequency (IF). When a single frequency tone from a tone generator 112 is injected at the input to tuner 104, the output of the tuner may include a single tone offset from the intermediate frequency (IF). When there is perfect gain and phase balance, this offset may be equal to the difference between the input frequency (RF) and local oscillator (LO) frequency. Usually, however, the output may include two tones centered on the IF frequency, due to gain and/or phase imbalance.

Figure 2:
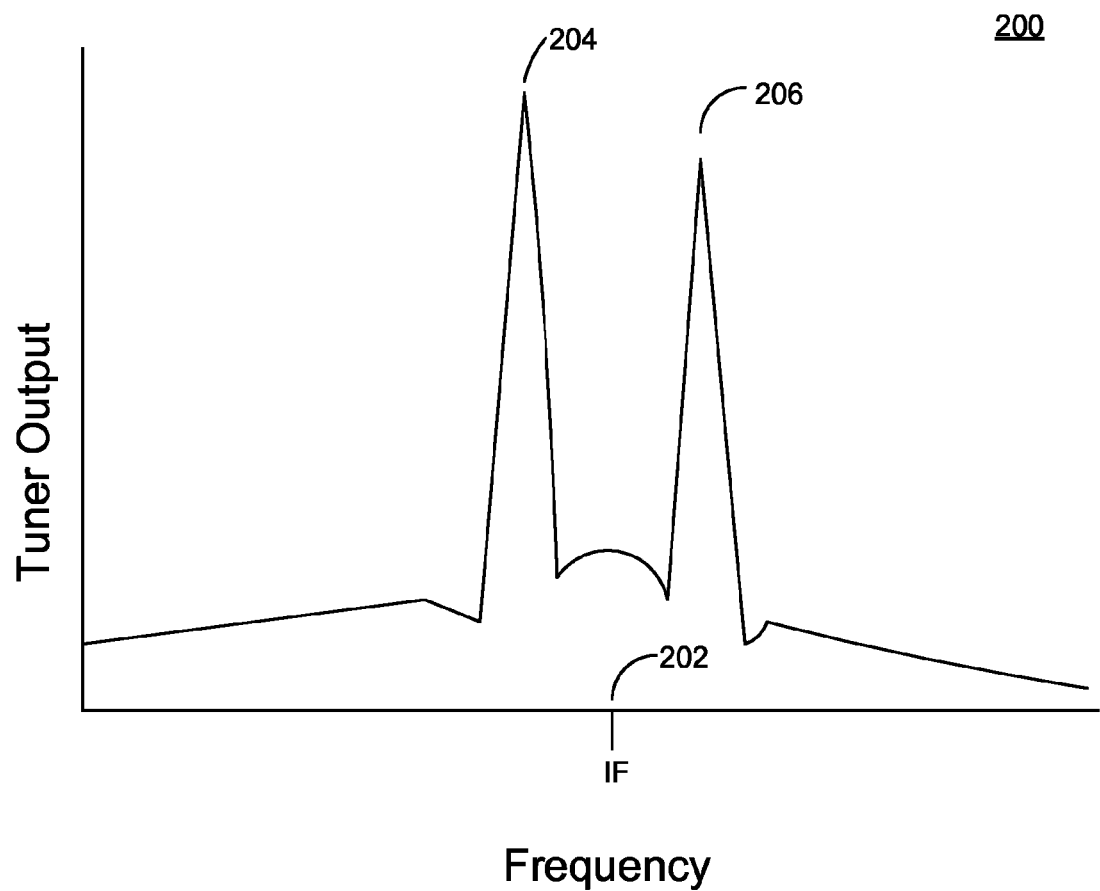
FIG. 2 illustrates one embodiment of output of a tuner.

FIG. 2 shows a graph 200 of an example of a more typical output from tuner 104, without phase imbalance correction, when tuner 104 receives a single frequency tone as an input. The tuner output includes two tones, 204 and 206, centered about the IF 202. The difference in level between these two tones 204 and 206 may be a measure of the imbalance.

Returning to FIG. 1, correction loop 106 may measure the phase imbalance of tuner 104, as the difference in the two tones, and remove the error introduced by the phase imbalance. In an embodiment, the phase imbalance may be minimized by increasing the difference in the levels of the two tones. Correction loop 106 is discussed in greater details with respect to FIG. 3. The correction from correction loop 106 may be input to tuner 104, via a variable delay element in the quadrature up-conversion stage, to correct the output, and the corrected output may be output to a demodulator 108, or to other receiver components.

Figure 3:
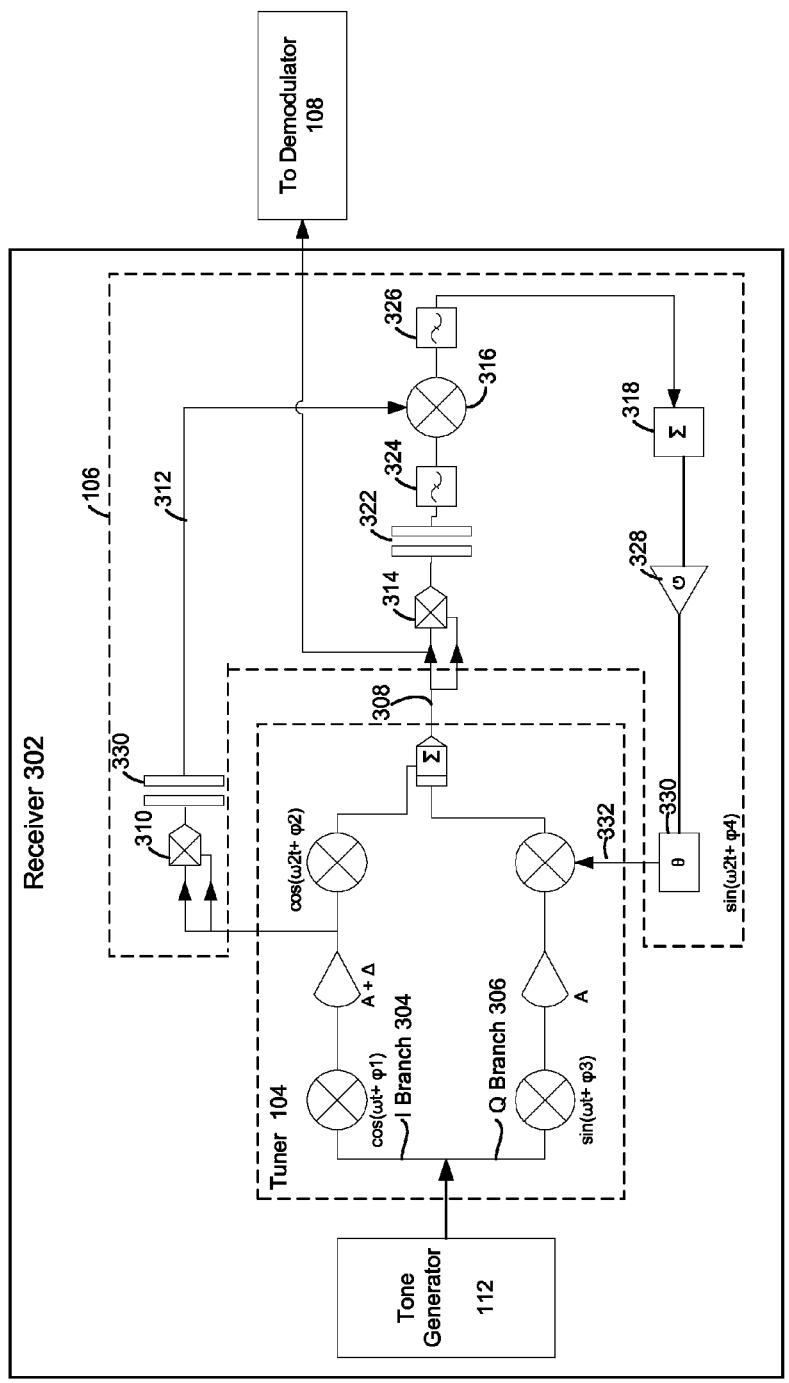
FIG. 3 illustrates one embodiment of a receiver and correction loop.

FIG. 3 illustrates an embodiment of a receiver 302, having a tuner 104, and components that may comprise correction loop 106. Tuner 104 may receive a single-frequency input tone from tone generator 112 and may perform quadrature demodulation on the tone to produce an in-phase reference branch (I branch) 304 and a quadrature phase (Q branch) 306. Tuner 104 may then output an intermediate frequency (IF) 308.

Correction loop 106 may include a first multiplier stage 310 coupled to the I branch 304. The signal in the "I" branch may be multiplied with itself at multiplier stage 310 to generate a local oscillator (LO) signal 312. Since this I branch signal is a single tone, the output of the multiplication process may include a DC term and a tone at a frequency equal to two times the frequency offset. The DC term may be removed using a DC blocker 320, and the remaining signal may be amplified before it is used as the LO signal at a mixer 316.

In an embodiment, the signal at the IF 308 summing point may be multiplied with itself at a second multiplier stage 314, coupled to the IF 308 output of the tuner 104, to generate an error signal from the IF output. This multiplication may generate a number of terms, including the wanted term at twice the frequency offset value.

To minimize the unwanted terms, correction loop 106 may further include a second DC blocker 322 at the output of the second multiplier stage 314 to remove the DC term, and a first filter 324 at the output of the second DC blocker 322 to remove the higher frequency terms. Filter 324 may be a low pass filter. The remaining cleaned signal may be positioned at a frequency equal to about two times the frequency offset, where the frequency offset is the difference between the RF signal carrier frequency and the local oscillator frequency used to translate the RF signal to baseband. Mixer 316 may mix the LO signal 312 and the blocked and filtered output of multiplier stage 314 down to DC. Mixer 316 may frequency-lock LO to the wanted signal.

The output from the mixer 316 may include a DC term that is a measure of the phase imbalance, along with at least one term at four times the frequency offset. A low pass filter 326 at the output may remove the higher frequency terms leaving the DC term.

DC blockers 322 and 330, and filters 324 and 326 may be collectively referred to herein as a signal cleaner.

The cleaned signal, i.e. the DC term, may be input to an integrator 318. The output of the integrator 318 may be scaled by a gain adjuster 328. The gain adjusted signal may be input to a variable delay element 330 used to control a delay line 332 in the quadrature phase generation network, correcting the phase imbalance.

Figure 4:
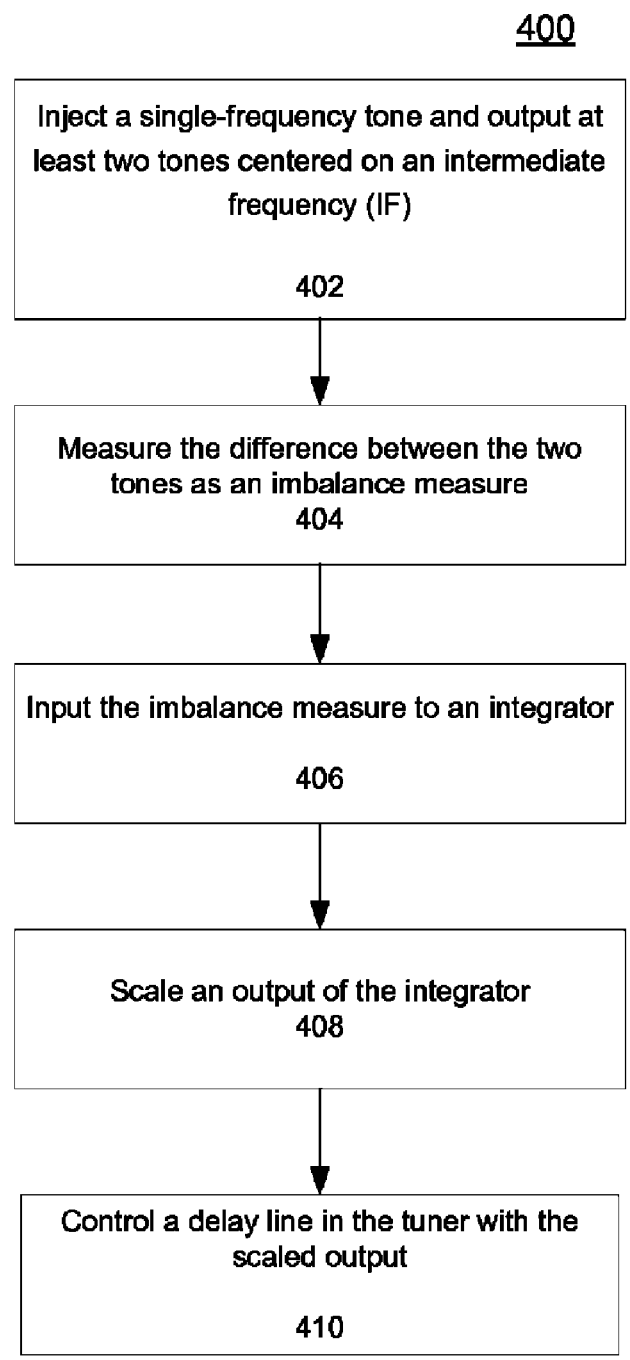
FIG. 4 illustrates one embodiment of a logic flow.

FIG. 4 illustrates one embodiment of a logic flow 400 for correcting a phase imbalance in a tuner. In various embodiments, the logic flow 400 may be performed by various systems and/or devices and may be implemented as hardware, software, and/or any combination thereof, as desired for a given set of design parameters or performance constraints. For example, the logic flow 400 may be implemented by a logic device (e.g., power controller) and/or logic (e.g., adaptive power control logic) comprising instructions, data, and/or code to be executed by a logic device. For purposes of illustration, and not limitation, the logic flow 400 is described with reference to FIG. 1. The embodiments are not limited in this context.

In block 402, a single-frequency tone may be injected at an input to a tuner, e.g. tuner 104. The output 308 of the tuner may then include at least two tones centered on an intermediate frequency (IF). In an embodiment, the single-frequency tone may be injected during a window of operation when media signal 110 is not being transmitted.

In block 404, the difference between the two tones may be measured. The difference may be referred to herein as an imbalance measure. In an embodiment, the difference may be measured by first multiplying the IF with itself to generate a wanted term at two times the frequency offset value. This product may also contain unwanted terms. For example, if the first tone is $f_1$ (e.g. tone 204) and the second tone is $f_2$ (e.g. tone 206), then the squaring the IF may yield the following terms: a DC term, $2 \times f_1$, $2 \times f_2$, $f_1+f_2$, and $f_1-f_2$. The imbalance measure may be included in the $f_1-f_2$ term, while the other terms are unwanted.

In block 406, the imbalance measure may be input to an integrator.

In block 408, the output of the integrator may be scaled.

In block 410, a delay line in the tuner may be controlled with the scaled output. In an embodiment where the tuner includes a quadrature down-conversion stage and a quadrature up-conversion stage following the quadrature down-conversion stage, and where the up-conversion stage has a variable delay element, scaled output of the integrator may be input to the variable delay element to generate a phase correction signal.

FIG. 5 illustrates one embodiment of a logic flow 500, describing an embodiment of block 404 in greater detail. In block 502, the unwanted terms may be removed from the multiplied IF term to produce a remaining signal. In an embodiment, the unwanted terms may be removed, for example, by blocking the DC term with a DC blocker, and removing higher frequency terms from the DC blocker with a low pass filter.

In block 504, the local oscillator (LO) may be frequency-locked to the wanted term. In an embodiment, the tuner may perform quadrature demodulation on the single-frequency tone producing a reference branch (I branch) and a Q branch. In such an embodiment, frequency-locking the LO may be accomplished by multiplying the I branch with itself to produce a DC term and a tone having a frequency of two times the frequency offset. Then the DC term may be removed, and the remaining signal may be amplified to produce LO.

In block 506, the frequency-locked LO may be mixed down to DC with the wanted signal, for example at mixer 316, generating a DC term and additional higher frequency terms. The higher frequency terms may be filtered out, and the DC term may be used as the imbalance measure.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within computing system registers and/or memories into other data similarly represented as physical quantities within the computing system memories, registers or other such information storage, transmission or display devices.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
   a tuner to receive a tone and perform quadrature demodulation on the tone producing an in-phase reference branch (I branch) and a quadrature phase (Q branch) and outputting an intermediate frequency (IF);
   a first multiplier stage coupled to the I branch to generate a local oscillator (LO) signal;
   a second multiplier stage coupled to the output of the tuner to generate an error signal from the IF output;
   a mixer to mix the output of the first and second multiplier stages;
   a signal cleaner to clean the outputs of the first and second multiplier stages; and
   an integrator to integrate the cleaned signals.

2. The apparatus of claim 1, wherein the signal cleaner comprises:
   a first DC blocker at an output of the first multiplier;
   a second DC blocker at an output of the second multiplier;
   a first filter at an output of the second DC blocker; and
   a second filter at an output of the mixer.

3. The apparatus of claim 1, wherein the tuner comprises:
   a quadrature down-conversion stage;
   a quadrature up-conversion stage following the quadrature down-conversion stage, the up-conversion stage having a variable delay element; and
   wherein the output of the integrator is input to the variable delay element to generate a phase correction signal.

4. The apparatus of claim 3, further comprising a gain adjuster to scale the output of the integrator prior to input in the variable delay element.

5. The apparatus of claim 1, wherein the tuner is a single chip tuner.

6. The apparatus of claim 1, comprising a single-frequency tone generator to generate the tone received by the tuner.

7. The apparatus of claim 6, wherein the tone is received by the tuner during a period when the tuner is not receiving other signals.

8. A system for correcting quadrature crosstalk contamination, comprising:
   a tone generator to produce a single frequency tone;
   a tuner to receive the single frequency tone and output an intermediate frequency, wherein the tuner performs quadrature demodulation on the single-frequency tone to produce an in-phase reference branch (I branch) and a quadrature phase (Q branch) and a quadrature phase (Q branch) and to output an intermediate frequency (IF); and
   a correction loop to correct a phase imbalance introduced by the tuner to the intermediate frequency, the correction loop comprises:
     a first multiplier stage coupled to the I branch to generate a local oscillator (LO) signal;
     a second multiplier stage coupled to the output of the tuner to generate an error signal from the IF output;
     a mixer to mix the output of the first and second multiplier stages;
     a signal cleaner to clean the outputs of the first and second multiplier stages; and
     an integrator to integrate the cleaned signals.

9. The system of claim 8, wherein the tuner comprises:
a quadrature down-conversion stage; and
a quadrature up-conversion stage following the quadrature down-conversion stage, the up-conversion stage having a variable delay element.

10. The system of claim 8, wherein the signal cleaner comprises:
a first DC blocker at an output of the first multiplier;
a second DC blocker at an output of the second multiplier;
a first filter at an output of the second DC blocker; and
a second filter at an output of the mixer.

11. The system of claim 8, wherein the output of the integrator is used to control the variable delay element.

12. The system of claim 8, wherein the first multiplier stage multiplies the I branch with itself to produce a DC term and a tone having a frequency of two times a frequency offset; removes the DC term; and amplifies the remaining signal to produce a frequency-locked LO.

13. The system of claim 8, wherein the single frequency tone is received by the tuner during a period when the tuner is not receiving other signals.

14. The system of claim 8, comprising a demodulator to receive the corrected intermediate frequency.

* * * * *

UNITED STATES PATENT AND TRADEMARK OFFICE
CERTIFICATE OF CORRECTION

| | | |
|---|---|---|
| PATENT NO. | : 8,301,102 B2 | Page 1 of 1 |
| APPLICATION NO. | : 12/646513 | |
| DATED | : October 30, 2012 | |
| INVENTOR(S) | : Isaac Ali et al. | |

It is certified that error appears in the above-identified patent and that said Letters Patent is hereby corrected as shown below:

In column 6, line 53-54, in claim 8, after "(Q branch)" delete "and a quadrature phase (Q branch)".

Signed and Sealed this
Twenty-second Day of January, 2013

David J. Kappos
*Director of the United States Patent and Trademark Office*